Aug. 30, 1955     J. C. ROSS     2,716,336
CAR LOCK
Filed Jan. 8, 1953     2 Sheets-Sheet 1
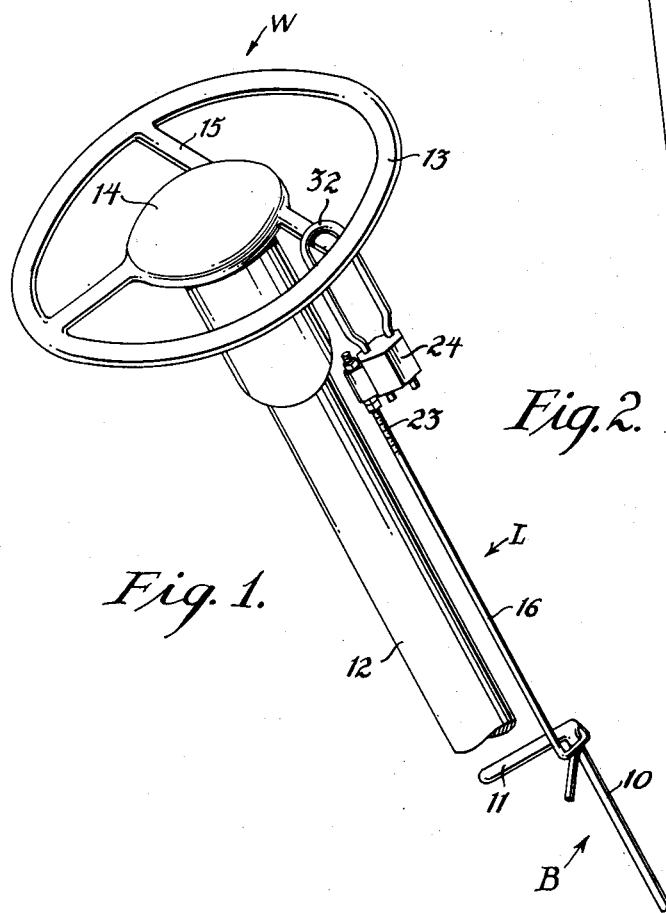
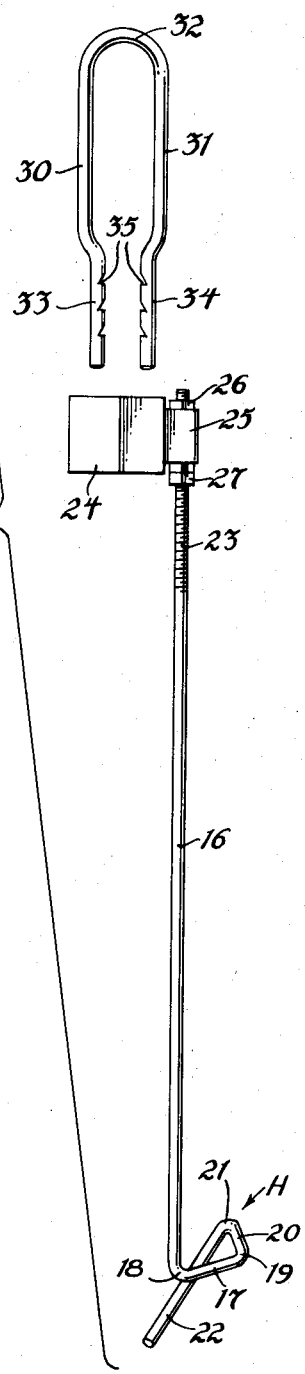
INVENTOR.
JOHN C. ROSS
BY *Porter & Boerner*
HIS ATTORNEYS.

Aug. 30, 1955  J. C. ROSS  2,716,336
CAR LOCK

Filed Jan. 8, 1953  2 Sheets-Sheet 2

INVENTOR.
JOHN C. ROSS
BY
HIS ATTORNEYS.

though the lock casing of a cyclic
United States Patent Office 2,716,336
Patented Aug. 30, 1955

2,716,336

CAR LOCK

John C. Ross, Philadelphia, Pa.

Application January 8, 1953, Serial No. 330,348

3 Claims. (Cl. 70—238)

The present invention relates to car locks and is concerned primarily with a lock of the type which provides a mechanical interlock between the handbrake and the steering wheel of the conventional automobile.

At the present time, the common practice in locking a motor vehicle against theft or use by unauthorized persons is to depend on either the ignition lock, or when the car is of the enclosed type, on the door lock. It has been found as an actual fact that a professional car thief has but little trouble in shortcircuiting the ignition lock and is equally capable of getting into the car by jimmying a door or breaking a window.

With the foregoing conditions in mind, the present invention has in view as its foremost objective, the provision of a car lock of the type which presents a strong and effective mechanical interlock between the steering wheel and the handbrake. It is evident that with the handbrake applied and the steering wheel turned so that the wheels are diverted from a straight position, a car thief will be unable to drive the car away or even tow it away.

In providing a car lock of the type aforesaid, certain conditions must be accommodated if the lock is to meet with public acceptance. In the first place, the lock must be susceptible of use with various makes of cars. In some cars the handbrake is located at the left of the steering wheel, on others it is at the right side. Then again, some handbrakes have a T-shaped handle, while others have a handle which extends only at one side of the brake shaft. Moreover, if a lock is to meet with the approval of the using public, it must be susceptible of quick and easy application and removal. A further object of the invention is to provide a car lock of the character indicated which will satisfy all of these conditions.

In achieving the above-noted objects, the present invention provides a locking device which includes as an essential and characteristic element, a shaft that is made of a tough, hard metal and which is formed at its lower end with a hook of unique shape which is adapted for application to the brake handle with quick and simple manipulation and which has adjustably mounted on its upper end the locking mechanism of a bicycle lock. The hasp of the bicycle lock is applied over the steering wheel after the hooked end of the shaft is applied to the brake handle.

Another important object of the invention is to provide, in a car lock of the character indicated, a shaft having a hook at one end and which hook includes an outwardly-extending arm that is disposed at an acute return angle with respect to the shaft to which it is integrally joined, with another arm being integrally joined to the outer end of said first arm and disposed substantially normal thereto. The tail piece of the hook is intergrally joined to the free end of this last-mentioned arm by another bend. This tail piece is disposed at a return acute angle with respect to the arm with which it is connected, is spaced from the first arm to provide an entrance for the hook, and is also angularly disposed relative to the shaft. A hook having these structural characteristics is particularly adapted for application to the handbrake shaft immediately beneath the handle and is not susceptible of removal by any amount of purely rotative action. When the other end of the shaft is locked to the steering wheel it is an utter impossibility to remove the hooked end from the handbrake.

Still another object of the invention is to provide, in a car lock of the character aforesaid, a shaft having an upper threaded end that is adapted to be screwed into a block extension that is carried by or formed on the casing of a conventional lock. Due to the threaded engagement the position of the lock casing may be adjusted, as occasion demands, and by employing lock nuts on both sides of the block extension an adjusted position may be secured.

Various other more detailed objects and advantages of the invention, such as arise in connection with carrying out the above-noted ideas in a practical embodiment, will in part become apparent and in part be hereinafter stated, as the description of the invention proceeds.

The invention therefore comprises a car lock which consists essentially of a hard, tough metal shaft having a hook of unique formation at one end that is adapted to be applied over the handbrake shaft beneath the handle with the other end carrying the lock casing of a bicycle lock, the hasp of which is adapted to be fitted over the steering wheel of the car.

For a full and more complete undertsanding of the invention, reference may be had to the following description and accompanying drawings, wherein:

Figure 1 is a perspective view of a car lock designed in accordance with the precepts of this invention and shown as applied to a handbrake and steering wheel.

Figure 2 is a view in front elevation showing the elements of the car lock in exploded relation.

Figure 3 is a top plan view of the lock casing per se.

Figure 6:
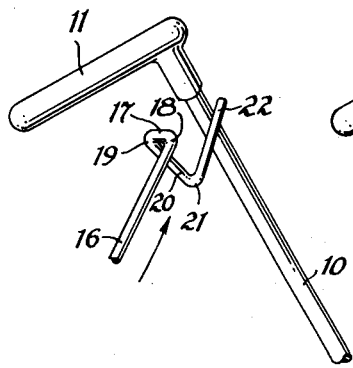
Figure 6 is a view in side elevation showing the initial position of the hook as it is first applied to the handbrake.

Referring now to the drawings wherein like reference characters denote corresponding parts and first more particularly to Figure 1, the handbrake of a motor vehicle is represented at B. It is to be clearly understood that the brake B is merely illustrative of one type of handbrake that is now meeting with wide-spread usage by car manufacturers. There are other types of handbrakes which are now being used, but as a general rule, it may be stated that the handbrake will include a shaft at 10 and a handle element 11 that is integrally joined to the upper end of the shaft 10.

As illustrated in Figure 1, the handle 11 extends outwardly at one side only. In other makes of cars the handle 11 extends across the top of the shaft 10 and forms a T-head. It is to be clearly understood, however, that the locking device of this invention is susceptible of use with any automobile handbrake having a shaft comparable to that shown at 10, and a handle at the free end, such as depicted at 11.

The steering wheel of the car is represented at W and is shown as mounted on a column 12, in accordance with conventional practice. The steering wheel W ordinarily comprises a circular ring-like member 13 that is joined to a hub 14 by spokes 15. The number of these spokes 15 will vary with different makes of cars.

The locking device of this invention is referred to in its entirety by the reference character L. It comprises a shaft 16 of a hard, tough metal, such as certain of the alloy steels which are now available on the open market. The main requirement of the shaft 16 is that it be resistant to cutting, as by a hack-saw or a file.

Figure 4:
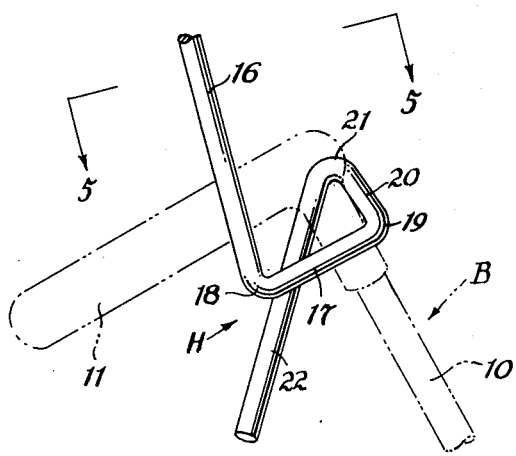
Figure 4 is a side elevational showing of the hook at one end of the shaft with the handle of a handbrake illustrated by broken lines.
Figure 5:
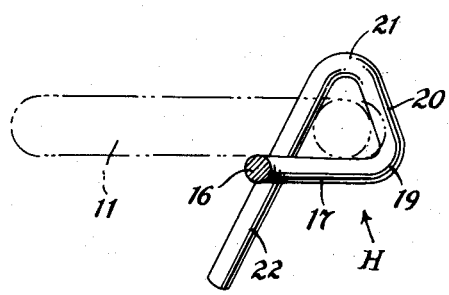
Figure 5 is a top plan view looking down on the hooked end of the shaft with the shaft proper shown in section. This view is taken about on the plane represented by the line 5—5 of Figure 4.

At its lower end, the shaft 16 is formed with a hook formation that is referred to in its entirety by the reference character H. Referring more particularly to Figures 4 and 5, it will be seen that the hook H comprises a first arm 17 that is integrally joined to the lower end of the shaft 16 by bend 18. It is important to note that the arm 17 is disposed at a return acute angle with respect to the shaft 16, that is, in forming the hook H the arm 17 is bent back towards the shaft 16 so that the angle between the two is somewhat less than 90°.

Integrally joined to the outer end of the first arm 17, as by a bend 19, is a second arm 20. At the end remote from the bend 19 the second arm 20 has integrally joined thereto, as by a bend 21, a tail piece 22 that is substantially straight, and which is arranged at the angle of substantially 45° to the second arm 20. It is important to note that the bend 21 has a wide curvature as compared to the bends 18 and 19, thereby presenting a curved portion of appreciable extent. This tail piece is also inclined downwardly with respect to the plane of the arms 17 and 20 so that it assumes a spaced relation with respect to the arm 17. It is the space between the tail piece 22 and the first arm 17 that defines the entrance to the hook.

The upper end of the shaft 16 is provided with screw threads, as indicated at 23. The casing of a bicycle lock is indicated at 24. This casing 24 may be formed with, or carry a block extension 25 having a threaded bore which receives the threaded portion 23 of the shaft 16.

It is evident that this threaded relation provides for the adjustment of the lock casing 24 on the shaft 16. After the lock casing 24 has been adjusted to a desired position on the shaft 16, the lock nuts shown at 26 and 27 may be tightened to secure the adjustment.

The lock casing 24 may be a lock casing of any conventional bicycle lock now commonly available on the open market. Such a casing ordinarily includes two apertures shown at 28 and 29, in Figure 3, which extend entirely through the casing. The hasp of the bicycle lock is shown as being of the conventional U-shaped formation, providing two legs 30 and 31 that are joined by a wide bend 32. In the particular make of lock illustrated in the drawings, the legs 30 and 31 have inwardly offset end portions 33 and 34 which are adapted to be inserted in the apertures 28 and 29. These end portions 33 and 34 are formed with notches 35 that cooperate with the locking mechanism within the casing 24 in a well-known manner.

*Operation*

While the manner of using the car lock of this invention is believed to be obvious from the illustrations of the drawings and description of parts given, it may be briefly outlined as follows.

When the operator of a motor vehicle brings his car to a stop he turns the steering wheel W so that the front wheels of the car are diverted from a straight-forward position. He then applies the brake B by pulling the handle 11 outwardly. The car is now in proper condition for application of the car lock.

Figure 7:
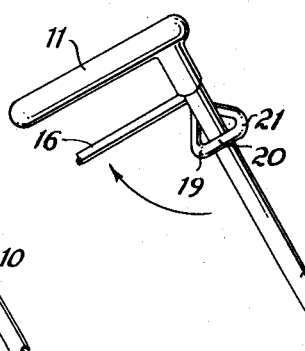
Figure 7 is a view similar to Figure 6, showing an intermediate position of the hook end during the application thereof to the handbrake.
Figure 8:
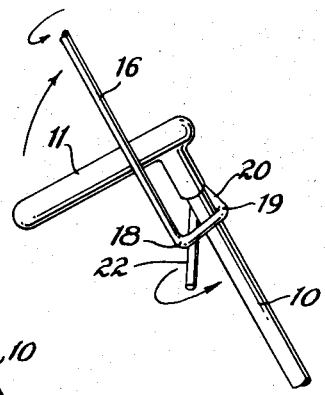
Figure 8 is another view similar to Figure 6, showing the position of the hook end after the swinging movement has been completed and just prior to being drawn up against the handbrake handle.

Assume that the operator of the car has first properly adjusted the lock case 24 on the shaft 16 and secured the adjustment by the lock nuts 26 and 27 so that the correct distance between the lock case 24 and hook H obtains. The operator now applies the hook H to the shaft 10 of the brake B beneath the handle 11 by the series of manipulations depicted in Figures 6, 7, and 8. The final step is to pull the shaft 16 upwardly into the position depicted in Figure 1. In this position the lock case 24 is disposed beneath the steering wheel W. The operator now applies the hasp of the lock over the steering wheel and then causes the end portions 33 and 34 to be inserted in the apertures 28 and 29, in a well-known manner. The hasp may be applied either over one of the spokes 15, or the rim 13, as circumstances dictate. In any event, the insertion of the legs of the shaft into the lock case is continued as far as possible so as to reduce to a minimum any play or loose movement in the shaft 16.

In this position, the handbrake B cannot be released, nor can the steering wheel W be turned. Thus, even if a car thief should succeed in gaining entry into the vehicle and bypassing the ignition lock, he would still be unable to drive the car away or even have it towed away.

While a certain preferred specific embodiment of the invention is hereinbefore set forth, it is to be clearly understood that the invention is not to be limited to the exact constructions, mechanisms and designs illustrated and described because various modifications of the details may be provided in putting the invention into practice within the purview of the appended claims.

What is claimed is:

1. In an automobile including a steering wheel and a hand brake having a shaft and a cross handle; a locking device comprising a metallic shaft having a hook at one end defined by a first arm integrally joined to said shaft and disposed at a return acute angle relative thereto, a second arm integrally joined to said first arm and substantially normal thereto, and a tail piece integrally joined to said second arm forming an acute angle with the plane of said first and second arms, the said tail piece lying in spaced relationship with said first arm; a lock case adjustably mounted on the other end of said shaft; and a hasp adapted to be fitted over said steering wheel and secured to said lock case.

2. In an automobile including a steering wheel and a hand brake having a shaft and a cross handle; a locking device comprising a metallic shaft having a hook at one end defined by a first arm integrally joined to said shaft and disposed at a return acute angle relative thereto, a second arm integrally joined to said first arm and substantially normal thereto, and a tail piece integrally joined to said second arm and being bent back toward said second arm at an angle of 45 degrees thereto, the said tail piece forming an acute angle with the plane of said first and second arms and lying in spaced relationship with said first arm so as to define a gap for receiving said shaft in said hook; a lock case having a block extension in screw-threaded engagement with the other end of said shaft; lock nuts on said shaft disposed at opposite sides of said block extension; and a hasp adapted to be fitted over said steering wheel and secured to said lock case.

3. In an automobile including a steering wheel and a hand brake having a shaft and a cross handle; a locking device comprising a metallic shaft having a hook at one end defined by a first arm integrally joined to said shaft and disposed at a return acute angle relative thereto, a second arm integrally joined to said first arm and substantially normal thereto, and a tail piece integrally joined to said second arm and being bent back toward said second arm at an angle of 45 degrees thereto, the said tail piece forming an acute angle with the plane of said first and second arms and lying in spaced relationship with said first arm so as to define a gap for receiving said shaft in said hook; a lock case having a block extension in screw-threaded engagement with the other end of said shaft; lock nuts on said shaft disposed at opposite sides of said block extension; and a U-shaped hasp consisting of parallel legs joined at one end by a wide arcuate bend with each of said legs having notched end portions, the bend of said hasp being adapted to be fitted over said steering wheel with both legs thereof secured in said lock case.

References Cited in the file of this patent

UNITED STATES PATENTS

| | | |
|---|---|---|
| 1,193,679 | Fox | Aug. 8, 1916 |
| 1,395,970 | Nidermaier | Nov. 1, 1921 |
| 1,519,086 | Coffman | Dec. 9, 1924 |